Patented Jan. 21, 1930

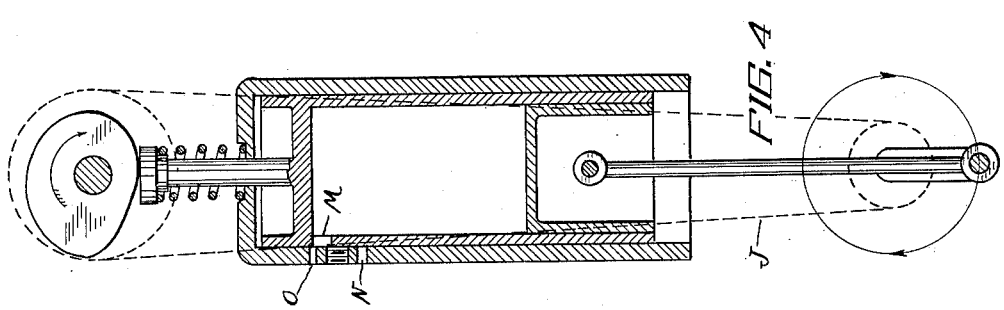
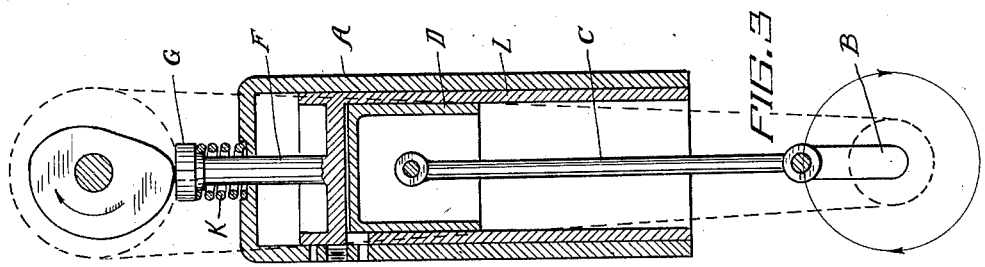
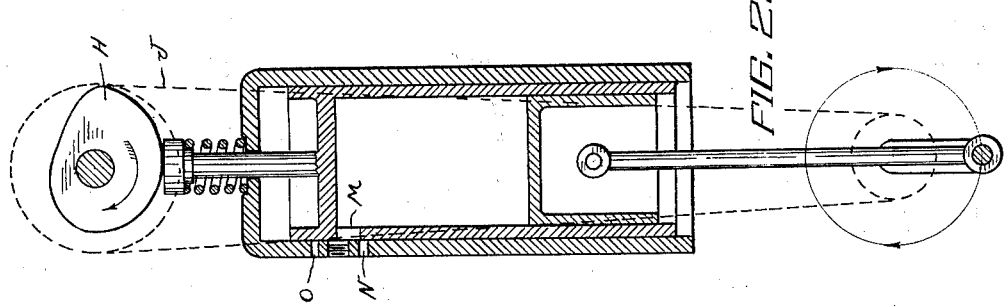

1,744,117

UNITED STATES PATENT OFFICE

JOSEPH HELD, OF SALT LAKE CITY, UTAH, ASSIGNOR OF ONE-HALF TO LAFAYETTE HANCHETT, OF SALT LAKE CITY, UTAH

INTERNAL-COMBUSTION ENGINE

Application filed April 25, 1927. Serial No. 186,456.

The invention relates to internal combustion engines and has for its primary object the complete scavenging of the burnt gases from the cylinder after the power stroke so as to utilize all of the space for the succeeding explosive charge.

It is a further object of the invention to accomplish this result by means also functioning as a valve for controlling the admission and exhaust.

With these objects in view the invention consists of the construction as hereinafter set forth.

In the drawings;

Figures 2, 3 and 4 are similar diagrammatic views illustrating the relative positions of parts at different points in the cycle.

Figure 1:
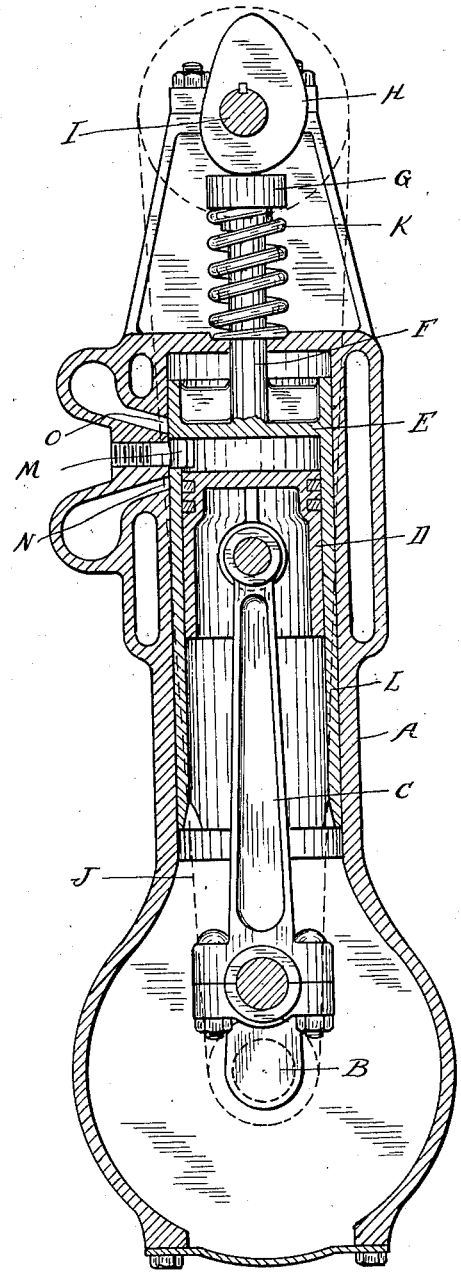
Figure 1 is a vertical longitudinal section through an internal combustion engine embodying my invention.

It is usual in the construction of internal combustion engines to provide a clearance space of fixed volume such as to give the desired compression to the explosive charge. As a consequence it is never possible to completely scavenge the cylinder from burnt gases by the displacement of the piston and the succeeding explosive charge is therefore commingled with and diluted by these inert gases. With my improved construction, in place of a clearance space of fixed volume I supplement the displacement of the piston by the operation of an auxiliary displacement member so that by their joint action the cylinder is completely scavenged.

As illustrated in Figure 1, A is the engine cylinder, B the crank shaft, C the pitman rod and D the piston. The cylinder A is extended upward beyond the upper limit of movement of the piston and in this upward extension is located a second piston or displacement member E. This is operated by any suitable mechanism which during the scavenging stroke of the piston will move the member E in an opposite direction and into close proximity thereto while during other parts of the cycle clearance is provided for the compressed gases. As specifically shown, the member E is actuated by a stem F passing upward through the head of the cylinder and having at its upper end a head G in operative relation to a cam H on a shaft I. This shaft is driven from the crank shaft in a one to two ratio by suitable means such as a sprocket and chain connection indicated by dotted lines at J. There is also sleeved upon the stem F a spring K having its upper end abutting against the head G whereby said head is caused to follow the cam.

With the construction as thus far described supplemented by any suitable construction of valve mechanism for controlling the admission and exhaust, it is obvious that the burnt gases will be completely scavenged from the cylinder after each power stroke and that a full charge of combustible mixture will occupy the clearance space during the compression stroke. I may however, combine this mechanism with a sleeve valve, such construction being specifically shown. Thus the displacement member E is formed by the upper end of a valve sleeve L which is intermediate the piston D and the cylinder A. This sleeve is provided with the port M which in the position shown in Figure 3 is in registration with an exhaust port N. On the other hand when in the position shown in Figure 4 the port N is in registration with an inlet port O in the cylinder while the port N is closed by the sleeve. In the position shown in Figure 2 both ports N and O are out of registration with the port M this being the position during the compression and power strokes.

The operation will be fully understood from the description as above but in brief is as follows: At the completion of each cycle the ports are in the position shown in Figure 3 where the piston D and displacement member E are in close proximity to each other. At the beginning of the succeeding cycle the abrupt recession in the cam H will permit the spring K to quickly move the member E and with it the valve sleeve L so as to close the port N and open the port O. At the same time the downward movement of the piston D will draw in the combustible charge. In the succeeding phase the charge is compressed by the upward movement of the piston into the clearance space provided therefor. It is then fired to effect the power stroke. Finally during the return movement of the piston after the power stroke the member E is moved in the opposite direction and again into the position shown in Figure 3.

What I claim as my invention is:

1. In an internal combustion engine, the combination with a cylinder having inlet and exhaust ports in the side walls thereof, of a headed sleeve valve within said cylinder having a port for alternate registration with said inlet and exhaust ports, a piston within said sleeve valve, a stem extending outward from said headed sleeve valve through the head of the cylinder, a spring on said stem for resiliently actuating the same in an outward direction and a cam for operating said stem in an inward direction being fashioned and timed to control the opening of said inlet and exhaust ports and to completely scavenge the cylinder after the power stroke.

2. In an internal combustion engine, the combination with a cylinder having inlet and exhaust ports in the side wall thereof, of a headed sleeve valve within said cylinder having a port for alternate registration on the said inlet and exhaust ports and provided with a stem extending outward through the head of said cylinder, a collar on the outer end of said stem, a spring sleeved upon said stem between said collar and the head of the cylinder, a piston in said sleeve and a cam operated by said engine and positioned to bear upon said stem, said cam being fashioned and timed to control the admission and exhaust and also to completely scavenge the exhaust gases.

In testimony whereof I affix my signature.

JOSEPH HELD.